(12) United States Patent
Li et al.

(10) Patent No.: US 11,963,491 B2
(45) Date of Patent: Apr. 23, 2024

(54) METHOD FOR ENRICHING LUTEIN IN BROCCOLI SPROUTS BY γ-AMINOBUTYRIC ACID COMBINED WITH SODIUM CHLORIDE STRESS

(71) Applicant: JIANGSU ACADEMY OF AGRICULTURAL SCIENCES, Jiangsu (CN)

(72) Inventors: Dajing Li, Jiangsu (CN); Weiwei He, Jiangsu (CN); Zhiyi Zhou, Jiangsu (CN); Yadong Xiao, Jiangsu (CN); Jiangfeng Song, Jiangsu (CN); Zhongyuan Zhang, Jiangsu (CN)

(73) Assignee: Jiangsu Academy Of Agricultural Sciences, Jiangsu (CN)

( * ) Notice: Subject to any disclaimer, the term of this patent is extended or adjusted under 35 U.S.C. 154(b) by 423 days.

(21) Appl. No.: 17/257,300

(22) PCT Filed: Oct. 26, 2020

(86) PCT No.: PCT/CN2020/123608
§ 371 (c)(1),
(2) Date: Dec. 30, 2020

(87) PCT Pub. No.: WO2021/232674
PCT Pub. Date: Nov. 25, 2021

(65) Prior Publication Data
US 2022/0110267 A1    Apr. 14, 2022

(30) Foreign Application Priority Data
May 21, 2020  (CN) .......................... 202010438549.4

(51) Int. Cl.
| | | |
|---|---|---|
| A01C 1/00 | (2006.01) | |
| A01C 1/08 | (2006.01) | |
| A01G 7/06 | (2006.01) | |
| A01G 31/00 | (2018.01) | |

(52) U.S. Cl.
CPC .................. *A01G 7/06* (2013.01); *A01C 1/08* (2013.01); *A01G 31/00* (2013.01)

(58) Field of Classification Search
CPC . A01G 7/00; A01G 7/06; A01G 24/00; A01G 31/00; A01C 1/08; A01C 1/00; A01C 1/02; A01N 37/44; A23L 33/00; A23L 33/10; A23L 33/16; A23L 33/17; A23L 33/105

See application file for complete search history.

(56) References Cited

PUBLICATIONS

H Yuan et al (Yuan, H., Zhang, J., Nageswaran, D., & Li, L. (2015). Carotenoid metabolism and regulation in horticultural crops. Horticulture Research, 2, 15036https://doi.org/10.1038/hortres.2015.36).*
Tian et al (Tian, L., Li, X., Yang, R., Gu, Z., NaCl Treatment Improves Reactive Oxygen Metabolism and Antioxidant Capacity in Broccoli Sprouts, Hortic. Environ. Biotechnol, 57(6):640-648. 2016 DOI 10.1007/s13580-016-0140-7).*
Kim et al (Kim, H., Fonseca, J., Choi, J., Kubota, C., and Kwon, D., (2008). Salt in Irrigation Water Affects the Nutritional and Visual Properties of Romaine Lettuce (*Lactuca sativa* L.), 3772, J. Agric. Food Chem. 56, 3772-3776.*
Y Wang et al (Wang, Y., Gu, W, Meng, Y., Xie, T., Li, L,, Li, J., and Wei, S., Scientific Reports, ϒ -Aminobutyric Acid Imparts Partial Protection from Salt Stress Injury to Maize Seedlings by Improving Photosynthesis and Upregulating Osmoprotectants and Antioxidants, 2017, 7:43609, DOI: 10.1038/srep43609 uploaded.*
Tian et al. Hortic. Environ. Biotechnol. 57(6): 640-648 (Year: 2016).*
Kalhor et al. Plant Physiology and Biochemistry 130: 157-172 (Year: 2018).*

* cited by examiner

*Primary Examiner* — Keith O. Robinson
(74) *Attorney, Agent, or Firm* — Neugeboren O'Dowd PC

(57) ABSTRACT

The present disclosure relates to a method for efficiently enriching lutein in broccoli sprouts under γ-aminobutyric acid combined with sodium chloride stress. In the present disclosure, Qingfeng broccoli seeds with plump particles, uniform size and germination ability are selected as raw materials; after removing impurities and being disinfected by a NaClO solution, the seeds are sprayed with distilled water for one day, then sprayed with a mixed aqueous solution of NaCl and γ-aminobutyric acid, to obtain broccoli sprouts.

2 Claims, No Drawings

METHOD FOR ENRICHING LUTEIN IN BROCCOLI SPROUTS BY γ-AMINOBUTYRIC ACID COMBINED WITH SODIUM CHLORIDE STRESS

CROSS REFERENCE TO RELATED APPLICATION

This application is a national Stage of International Application No. PCT/CN2020/123608 filed on Oct. 26, 2020 which claims the priority to Chinese Patent Application No. 202010438549.4, entitled "Method for enriching lutein in broccoli sprouts by γ-aminobutyric acid combined with sodium chloride stress" filed with the China National Intellectual Property Administration on May 21, 2020, which is incorporated herein by reference in its entirety.

TECHNICAL FIELD

The present disclosure relates to a method for enriching lutein in broccoli sprouts by γ-aminobutyric acid combined with sodium chloride stress, belonging to the technical field of agricultural products processing.

BACKGROUND

Lutein is an oxygen-containing carotenoid without vitamin A activity, and widely exists in in fruits and vegetables, flowers and some algae. Lutein, as an antioxidant, plays an important role in protecting the macular area of human retina, could inactivate singlet oxygen by physical or chemical quenching, and protects cells and organs from the damage caused by free radicals in human body, thus preventing diseases such as cardiovascular sclerosis and coronary heart disease and enhancing the immunity of the body. Besides, lutein is one of the main carotenoids in human blood, which can restrain many cancers such as breast cancer, gastric cancer and colon cancer. Lutein is widely used in food and medicine industries because of its superior physiological function. Some researchers have proved that lutein is the most abundant carotenoid in broccoli, and its synthesis is significantly influenced by the expression of key enzyme genes during the metabolism of carotenoid. In the metabolism process, the synthesis of lutein is not only influenced by positive regulation, but also influenced significantly by the reverse regulation of zeaxanthin epoxidase (ZEP) and violaxanthin de-epoxidase (VDE).

Broccoli is an annual or biennial herb in Brassica of Cruciferae, and is rich in many nutrients such as protein, vitamin C ($V_C$), vitamin B ($V_B$) and minerals. Anthocyanins and polyphenols in broccoli have antioxidant ability and can prevent chronic diseases. Isothiocyanate, being a hydrolysate of glucosinolate with the presence of myrosinase, plays an anti-cancer role by inhibiting stage enzymes and activating stage enzymes, thus preventing various cancers. Seed germination and growth are accompanied by the mutual conversion of inclusions, which enhances the nutritional value and functional characteristics of sprouts. Many studies proved that compared with those in mature broccoli, broccoli sprouts have 10-50 times of glucosinolate, and have 10-100 times of isothiocyanate, sulforaphane, which has the strongest anticancer effect so far. Therefore, broccoli sprouts have attracted more and more attention in recent years.

γ-aminobutyric acid (GABA) is a natural non-protein amino acid with four carbon atoms and widely exists in animals and plants. It not only plays a role of molecular signal as an inhibitory neurotransmitter in mammals and participates in a variety of metabolic activities in the central nervous system, but also has a variety of physiological functions, such as promoting brain metabolism, improving nerve function, calming nerves, improving respiration, lowering blood sugar, inhibiting tumors and treating mental diseases. Meanwhile, γ-aminobutyric acid exhibits many physiological effects in different tissues of various plants, but its content in plant tissues is generally very low. Studies showed that endogenous γ-aminobutyric acid can be accumulated under adversity stress, which has been widely concerned by scholars. CN 201210464080.7 discloses an instant seasoning bean sprouts with high content of γ-aminobutyric acid and a method for producing the same, the method comprising the following steps: germinating bean seeds under hypoxia stress to achieve bean sprouts rich in γ-aminobutyric acid, subjecting the bean sprouts to a blanching and color protecting with a mixed aqueous solution of citric acid and $CaCl_2$, and finally adding a flavor agent thereto and sterilizing the resulting mixture to obtain an instant food. CN 201210464186.7 discloses a germinated brown rice rich in γ-aminobutyric acid with a low crackle ratio, and a method for producing the same, in which an acid humidification for conditioning, a germination under a low temperature and a low oxygen stress, and a drying are integrated; with this method, it makes possible to produce a germinated brown rice that may be milled, with a high GABA content and a low crackle ratio.

Germination is a convenient and low-cost means to produce sprouts. Moreover, there are few controlled factors in the production of sprouts, and the sprouts can be eaten raw, which reduces the loss of nutrients caused by processing. CN 201610886208.7 discloses a broccoli sprout rich in sulforaphane and a method for germinating the same; in this method, broccoli seeds are germinated with an electrolyzed water as a culture solution, which remarkably increases the sulforaphane content in the sprouts. CN 201811607510.X discloses an environmental-friendly method for cultivating broccoli sprouts rich in flavonoids, in which broccoli seeds are subjected to a physical and chemical combined disinfection (including an ultraviolet lamp irradiating and a soaking) and a culturing under dark, which increases the germination rate and the flavonoids content.

SUMMARY

The present disclosure is to provide a cultivation method for enriching lutein in broccoli sprouts.

At present, it is known that marigold is an ideal raw material for extracting lutein. In recent years, researchers have found that fruits and vegetables such as spinach, citrus, tomato and pumpkin seeds are also rich in lutein. The above patents only involve the enrichment of γ-aminobutyric acid by germinating plant seeds and the enrichment of sulforaphane and flavonoids in broccoli seeds, but do not involve the enrichment of lutein in broccoli sprouts. As broccoli is rich in a variety of substances beneficial to human health, with further research, the broccoli sprouts will be widely used.

In the prior art, existing related studies showed that a treatment with a proper concentration of NaCl contributes to the productions of lutein in corn and phenolics in germinated soybean; however, the germination method for synergistically treating broccoli sprouts with NaCl and GABA has not been studied yet. In addition, although the sulforaphane in broccoli decreases with the growth of sprouts, it is still many times higher than that in mature broccoli. By researching and optimizing the prior art, the present disclosure makes it possible to obtain a cultivation method which can not only improve the contents of lutein and sulforaphane in broccoli sprouts, but also increase their yield and enrichment.

In this method, Qingfeng (the name of a seed variety) broccoli seeds with plump particles, uniform size and germination ability are selected as raw materials; after removing impurities and disinfecting with a NaClO solution with a concentration of 0.5%, the seeds are placed in a constant temperature incubator at 25° C.; under a light cycle of 16 h illumination/8 h darkness, the seeds are sprayed with a mixed aqueous solution of NaCl and γ-aminobutyric acid, so as to cultivate the seeds to produce sprouts with excellent performances and strong roots, and realize efficient enrichment of lutein in broccoli sprouts.

The present disclosure provides a method for enriching lutein in broccoli sprouts by γ-aminobutyric acid combined with sodium chloride stress, comprising the following steps: selecting Qingfeng broccoli seeds with plump particles and germination ability as raw materials, removing impurities, then soaking the seeds in a sodium hypochlorite solution for disinfection, spraying distilled water for germination for one day, and then spraying a mixed aqueous solution of NaCl and γ-aminobutyric acid, to obtain broccoli sprouts rich in lutein.

In some embodiments, the method comprises the following steps:
(1) selection of raw materials: selecting Qingfeng broccoli seeds with plump particles, uniform size and germination ability as raw materials;
(2) disinfection: removing impurities in the seeds, rinsing the seeds for 1-2 times with distilled water, and soaking in a NaClO solution with a concentration of 0.5% for 15-20 min;
(3) soaking treatment: filtering the NaClO solution to obtain disinfected seeds, rinsing the disinfected seeds for 5-8 times with distilled water until the seeds are neutral, and soaking in distilled water at 30° C. for 4 h;
(4) seeds germination: filtering the distilled water to obtain soaked seeds, uniformly scattering the soaked seeds on germination trays covered with vermiculite, placing in a constant temperature incubator at 25° C., and spraying distilled water for germination for one day under a light cycle of 16 h illumination/8 h darkness; and
(5) spraying treatment: after germination for one day, spraying 20 mL of a mixed aqueous solution of NaCl with a concentration of 100 mM and γ-aminobutyric acid every 12 h for four days, to obtain broccoli sprouts.

In some embodiments, the concentration of the γ-aminobutyric acid in the mixed aqueous solution is 0.25-1.00 mmol/L.

In some embodiments, the mixed aqueous solution for spraying is used in such an amount that sprouts can be infiltrated.

In some embodiments, after being treated with the mixed aqueous solution of NaCl and γ-aminobutyric acid, the expressions of genes of key enzymes, i.e., zeaxanthin epoxidase (ZEP) and violaxanthin de-epoxidase (VDE), for lutein synthesis increase by 0.87-2.41 times and 1.14-2.75 times respectively, and the content of lutein in sprouts is 24.1-29.0 times higher than that of seeds. Moreover, GABA could significantly alleviate the inhibition of NaCl on the growth of broccoli sprouts, and the fresh weight of broccoli sprouts increases by more than 40% compared with those without salt.

The present disclosure provides a cultivation method for enriching lutein in broccoli sprouts, comprising the following steps:
(1) selection of raw materials: selecting Qingfeng broccoli seeds with plump particles, uniform size and germination ability as raw materials;
(2) disinfection: removing impurities in the seeds, rinsing the seeds for 1-2 times with distilled water, and soaking in a NaClO solution with a concentration of 0.5% for 15-20 min;
(3) soaking treatment: filtering the NaClO solution to obtain disinfected seeds, rinsing the disinfected seeds for 5-8 times with distilled water until the seeds are neutral, and soaking in distilled water at 30° C. for 4 h;
(4) seeds germination: filtering the distilled water to obtain soaked seeds, uniformly scattering the soaked seeds on germination trays covered with vermiculite, placing in a constant temperature incubator at 25° C., and spraying distilled water for germination for one day under a light cycle of 16 h illumination/8 h darkness; and
(5) spraying treatment: after germination for one day, spraying 20 mL of a NaCl aqueous solution with a concentration of 100 mM every 12 h for four days, to obtain broccoli sprouts.

The present disclosure has the following beneficial effects:
1. The γ-aminobutyric acid selected in the present disclosure widely exists in animals, plants and microorganisms, and is harmless to the growth of plants as an inherent endogenous substance.
2. In the present disclosure, broccoli seeds are used as raw materials, and subjected to a spraying treatment with a NaCl solution with a concentration of 100 mM for 4 days, significantly improving the content of lutein in sprouts, which is 1.4 times higher than that of sprouts in the control group (Comparative example 2) and 24.1 times higher than that of the non-germinated seeds (Comparative example 1).
3. In the present disclosure, the expressions of ZEP gene and VDE gene increase by about 0.87-2.41 times and 1.14-2.75 times respectively by spraying 1 mM of γ-aminobutyric acid under NaCl stress; the content of lutein in broccoli sprouts is obviously improved by reverse regulation, which is 1.7 times higher than that of the control group (Comparative example 2) and 29.0 times higher than that of the non-germinated seeds (Comparative example 1).
4. According to the present disclosure, adding a γ-aminobutyric acid solution during a NaCl stress treatment may reduce the damage to broccoli sprouts under NaCl stress, enhance their resistance, promote the production of the active substances in the synthetic sprouts, improve the content of lutein and sulforaphane, and increase the fresh weight and yield at the same time.
5. The broccoli germination method provided by the present disclosure is simple, safe and reliable for operation, and the broccoli sprouts obtained by the same may be eaten raw, and may also be made into powder products and other functional foods that play an important role for human anti-cancer and health care and so on.

DETAILED DESCRIPTION

In order to make the technical problems to be solved and technical solutions of the present disclosure clearer, the present disclosure will be further illustrated in detail with reference to the following examples. It should be understood that the specific examples described herein are only used to illustrate the present disclosure, and are not used to limit the present disclosure.

Example 1

A cultivation method for enriching lutein in broccoli sprouts, comprising the following steps:
(1) Selection of raw materials: Qingfeng broccoli seeds with plump particles, uniform size and germination ability were selected as raw materials.
(2) Disinfection: Impurities in the seeds were removed to obtain clean seeds; the clean seeds were rinsed for 1-2 times with distilled water, and soaked in a NaClO solution with a concentration of 0.5% for 20 min.
(3) Soaking treatment: The NaClO solution was filtered to obtain disinfected seeds; the disinfected seeds were rinsed for 5-8 times with distilled water until the seeds were neutral, and then soaked in distilled water at 30° C. for 4 h.
(4) Seeds germination: The distilled water was filtered to obtain soaked seeds; the soaked seeds were uniformly scattered on germination trays covered with vermiculite, placed in a constant temperature incubator at 25° C., and sprayed with distilled water for germination for one day under a light cycle of 16 h illumination/8 h darkness.
(5) Spraying treatment: After germination for one day, the seeds were sprayed with 20 mL of a NaCl aqueous solution with a concentration of 100 mM every 12 h for four days, to obtain broccoli sprouts.
(6) Freeze-drying: The obtained sprouts were washed with distilled water, treated by double-layer filter papers to absorb all water, quickly frozen with liquid nitrogen, subjected to a pre-frozen in a refrigerator at −80° C. for 24 h, then subjected to a freeze-drying treatment in a vacuum freeze dryer, and then pulverized for testing.
(7) Testing and analysis: A qRT-PCT analysis showed that the expressions of ZEP gene and VED gene in the broccoli sprouts increased by 0.63 times and 0.98 times respectively. The content of lutein in the broccoli sprouts is 565.35 μg/g DW, as determined by a high performance liquid chromatography analysis.

Example 2

A cultivation method for enriching lutein in broccoli sprouts, comprising the following steps:
(1) Selection of raw materials: Qingfeng broccoli seeds with plump particles, uniform size and germination ability were selected as raw materials.
(2) Disinfection: Impurities in the seeds were removed to obtain clean seeds; the clean seeds were rinsed for 1-2 times with distilled water, and soaked in a NaClO solution with a concentration of 0.5% for 20 min.
(3) Soaking treatment: The NaClO solution was filtered to obtain disinfected seeds; the disinfected seeds were rinsed for 5-8 times with distilled water until the seeds were neutral, and then soaked in distilled water at 30° C. for 4 h.
(4) Seeds germination: The distilled water was filtered to obtain soaked seeds; the soaked seeds were uniformly scattered on germination trays covered with vermiculite, placed in a constant temperature incubator at 25° C., and sprayed with distilled water for germination for one day under a light cycle of 16 h illumination/8 h darkness.
(5) Spraying treatment: After germination for one day, the seeds were sprayed with 20 mL of a mixed aqueous solution of NaCl with a concentration of 100 mM and γ-aminobutyric acid with a concentration of 0.25 mM every 12 h for four days, to obtain broccoli sprouts, and the obtained broccoli sprouts had a fresh weight of about 24.80 mg per plant.
(6) Freeze-drying: The obtained sprouts were washed with distilled water, treated by double-layer filter papers to absorb all water, quickly frozen with liquid nitrogen, then subjected to a pre-frozen in a refrigerator at −80° C. for 24 h, then subjected to a freeze-drying treatment in a vacuum freeze dryer, and then pulverized for testing.
(7) Testing and analysis: A qRT-PCT analysis showed that the expressions of ZEP gene and VED gene in the broccoli sprouts increased by 1.47 times and 2.06 times respectively. The contents of lutein and sulforaphane in the broccoli sprouts were 637.74 μg/g DW and 1.72 mg/g DW respectively, as determined by a high performance liquid chromatography analysis.

Example 3

A cultivation method for enriching lutein in broccoli sprouts, comprising the following steps:
(1) Selection of raw materials: Qingfeng broccoli seeds with plump particles, uniform size and germination ability were selected as raw materials.
(2) Disinfection: Impurities in the seeds were removed to obtain clean seeds; the clean seeds were rinsed for 1-2 times with distilled water, and soaked in a NaClO solution with a concentration of 0.5% for 20 min.
(3) Soaking treatment: The NaClO solution was filtered to obtain disinfected seeds; the disinfected seeds were rinsed for 5-8 times with distilled water until the seeds were neutral, and then soaked in distilled water at 30° C. for 4 h.
(4) Seeds germination: The distilled water was filtered to obtain soaked seeds; the soaked seeds were uniformly scattered on germination trays covered with vermiculite, placed in a constant temperature incubator at 25° C., and sprayed with distilled water for germination for one day under a light cycle of 16 h illumination/8 h darkness.
(5) Spraying treatment: After germination for one day, the seeds were sprayed with 20 mL of a mixed aqueous solution of NaCl with a concentration of 100 mM and γ-aminobutyric acid with a concentration of 0.50 mM every 12 h for four days to obtain broccoli sprouts, and the obtained broccoli sprouts had a fresh weight of about 26.98 mg per plant.
(6) Freeze-drying: The sprouts were washed with distilled water, treated by double-layer filter papers to absorb all water, quickly frozen with liquid nitrogen, then subjected to a pre-frozen in a refrigerator at −80° C. for 24 h, then subjected to a freeze-drying treatment in a vacuum freeze dryer, and then pulverized for testing.
(7) Testing and analysis: A qRT-PCT analysis showed that the expressions of ZEP gene and VED gene in the broccoli sprouts increased by 0.87 times and 1.14 times respectively. The contents of lutein and sulforaphane in the broccoli sprouts were 569.87 μg/g DW and 1.39 mg/g DW respectively, as determined by a high performance liquid chromatography analysis.

Example 4

A cultivation method for enriching lutein in broccoli sprouts, comprising the following steps:
(1) Selection of raw materials: Qingfeng broccoli seeds with plump particles, uniform size and germination ability were selected as raw materials.
(2) Disinfection: Impurities in the seeds were removed to obtain clean seeds; the clean seeds were rinsed for 1-2 times with distilled water, and soaked in a NaClO solution with a concentration of 0.5% for 20 min.
(3) Soaking treatment: The NaClO solution was filtered to obtain disinfected seeds; the disinfected seeds were rinsed for 5-8 times with distilled water until the seeds are neutral, and then soaked in distilled water at 30° C. for 4 h.
(4) Seeds germination: The distilled water was filtered to obtain soaked seeds; the soaked seeds were uniformly scattered on germination trays covered with vermiculite, placed in a constant temperature incubator at 25° C., and sprayed with distilled water for germination for one day under a light cycle of 16 h illumination/8 h darkness.
(5) Spraying treatment: After germination for one day, the seeds were sprayed with 20 mL of a mixed aqueous solution of NaCl with a concentration of 100 mM and γ-aminobutyric acid with a concentration of 1.00 mM every 12 h for four days to obtain broccoli sprouts, and the obtained broccoli sprouts had a fresh weight of about 26.52 mg per plant.
(6) Freeze-drying: The sprouts were washed with distilled water, treated by double-layer filter papers to absorb all water, quickly frozen with liquid nitrogen, then subjected to a pre-frozen in a refrigerator at −80° C. for 24 h, then subjected to a freeze-drying treatment in a vacuum freeze dryer, and then pulverized for testing.
(7) Testing and analysis: A qRT-PCT analysis showed that the expressions of ZEP gene and VED gene in the broccoli sprouts increased by 2.41 times and 2.75 times respectively. The contents of lutein and sulforaphane in the broccoli sprouts were 681.90 μg/g DW and 1.64 mg/g DW respectively, as determined by a high performance liquid chromatography analysis.

Comparative Example 1

(1) Selection of raw materials: Qingfeng broccoli seeds with plump particles, uniform size and germination ability were selected as raw materials.
(2) Disinfection: Impurities in the seeds were removed to obtain clean seeds; the clean seeds were rinsed for 1-2 times with distilled water, and soaked in a NaClO solution with a concentration of 0.5% for 20 min.
(3) Freeze-drying: The NaClO solution was filtered to obtain disinfected seeds; the disinfected seeds were rinsed for 5-8 times with distilled water until the seeds were neutral, and treated by double-layer filter papers to absorb all water, quickly frozen with liquid nitrogen, then subjected to a pre-frozen in a refrigerator at −80° C. for 24 h, then subjected to a freeze-drying treatment in a vacuum freeze dryer, and then pulverized for testing.
(4) High performance liquid chromatography analysis: With a high performance liquid chromatography analysis, it was determined that the contents of lutein and sulforaphane in the broccoli seeds were 23.50 μg/g DW and 5.53 mg/g DW, respectively.

Comparative Example 2

This comparative example is the same as Example 1 except that after step (4), the seeds were sprayed with 20 mL of distilled water every 12 h for four days to obtain broccoli sprouts, and the obtained broccoli sprouts had a fresh weight of about 17.73 mg per plant. The obtained sprouts were washed with distilled water, treated by double-layer filter papers to absorb all water, quickly frozen with liquid nitrogen, then subjected to a pre-frozen in a refrigerator at −80° C. for 24 h, then subjected to a freeze-drying treatment in a vacuum freeze dryer, and then pulverized for testing. With a high performance liquid chromatography analysis, it was determined that the contents of lutein and sulforaphane in the broccoli sprouts were 397.17 μg/g DW and 0.17 mg/g DW respectively.

It can be seen from the above examples and comparative examples that: the expressions of ZEP gene and VDE gene increased by about 0.87-2.41 times and 1.14-2.75 times respectively by spraying 1 mM of γ-aminobutyric acid under NaCl stress; the content of lutein in broccoli sprouts was obviously improved by reverse regulation, which was 1.7 times higher than that of the control group (Comparative example 2) and 29.0 times higher than that of the non-germinated seeds (Comparative example 1); adding a γ-aminobutyric acid solution during a NaCl stress treatment could reduce the damage to broccoli sprouts under NaCl stress, enhance their resistance, promote the production of the active substances in the synthetic sprouts, improve the contents of lutein and sulforaphane, and increase the fresh weight and yield at the same time.

The above examples are only preferred embodiments of the present disclosure, and should not be regarded as limiting the scope and concept of the present disclosure. For those skilled in the art, equivalent substitutions and improvements can be made without departing from the protection scope of the present disclosure, all of which belong to the protection scope of the present disclosure. The technical contents claimed in the disclosure have been recited in the claims, and the specific embodiments in the description can be used to illustrate the contents of the claims.

What is claimed is:
1. A method for enriching lutein in broccoli sprouts by γ-aminobutyric acid combined with sodium chloride stress, comprising the following steps:
selecting broccoli seeds as raw materials,
removing impurities in the broccoli seeds,
subjecting the broccoli seeds to disinfection using a sodium hypochlorite solution to obtain disinfected seeds,
subjecting the disinfected seeds to soaking treatment to obtain soaked seeds,
subjecting the soaked seeds to germination for one day to obtain germinated seeds, and
spraying 20 mL of a mixed aqueous solution of NaCl and γ-aminobutyric acid onto the germinated seeds every 12 h for four days, to obtain broccoli sprouts rich in lutein, wherein a concentration of NaCl in the mixed aqueous solution is 100 mM, and a concentration of γ-aminobutyric acid in the mixed aqueous solution is 0.25-1.00 mmol/L.

2. The method as claimed in claim 1, wherein
the disinfection is conducted by rinsing the broccoli seeds for 1-2 times with distilled water to obtain rinsed seeds, and soaking the rinsed seeds in a NaClO solution with a concentration of 0.5% for 15-20 min, and draining the NaClO solution to obtain disinfected seeds;

the soaking treatment is conducted by rinsing the disinfected seeds with distilled water until the seeds are neutral to obtain neutral seeds, and soaking the neutral seeds in distilled water at 30° C. for 4 h, and draining the distilled water to obtain soaked seeds; and the germination is conducted by scattering the soaked seeds on germination trays covered with vermiculite, placing the germination trays in a constant temperature incubator at 25° C., and spraying distilled water onto the soaked seeds for germination for one day under a light cycle of 16 h illumination/8 h darkness to obtain germinated seeds.

\* \* \* \* \*